United States Patent [19]

Cook

[11] Patent Number: 4,595,319

[45] Date of Patent: Jun. 17, 1986

[54] PNEUMATIC CONVEYING SYSTEM ELBOW

[75] Inventor: Richard H. Cook, Houston, Tex.

[73] Assignee: Cubeco, Inc., Houston, Tex.

[21] Appl. No.: 616,734

[22] Filed: Jun. 4, 1984

[51] Int. Cl.⁴ .............................................. B65G 53/52
[52] U.S. Cl. .................................... 406/195; 285/179; 406/193
[58] Field of Search ................. 406/35, 193, 195, 191; 285/179, 183, 127

[56] References Cited

U.S. PATENT DOCUMENTS

| | | | |
|---|---|---|---|
| 1,595,841 | 8/1926 | Wang | 285/127 |
| 1,816,670 | 7/1931 | Church | 285/127 |
| 2,955,851 | 10/1960 | Scott | 285/127 |
| 4,175,892 | 11/1979 | De Brey | 406/35 |

FOREIGN PATENT DOCUMENTS 13962 of 1894 United Kingdom ................ 285/179

Primary Examiner—Jeffrey V. Nase
Attorney, Agent, or Firm—Hubbard, Thurman, Turner & Tucker

[57] ABSTRACT

Disclosed is an elbow for use in pelletized plastic conveying systems. The elbow includes first and second legs disposed at an angle to each other with an impingement plate disposed therebetween. The impingement plate is positioned to deflect pellets traveling substantially parallel to the axis of the first leg to travel substantially parallel to the axis of the second leg. The elbow includes a funnel section positioned to receive particles deflected by the impingement plate and funnel them toward the second leg. The funnel section also reduces the velocity of the pellets in the vicinity of the impingement plate.

4 Claims, 2 Drawing Figures

PNEUMATIC CONVEYING SYSTEM ELBOW

BACKGROUND OF THE INVENTION

A. Field of the Invention

The present invention relates generally to pneumatic conveying systems and more particularly to an elbow for use in such systems that minimizes or reduces the formation of fines and streamers during the conveyance of pelletized plastic products.

B. Description of the Prior Art

Pelletized plastic products are typically conveyed pneumatically through piping systems. The plastic pellets travel through the systems at relatively high velocities and the pellets are subject to degradation due to heat of friction generated as the pellets come into tangential contact with the pipe wall.

One form of material degredation is the fomation of "fines", which involves the chipping away of small pieces of the plastic product. A second form of degradation is the formation of "streamers", which occurs when the plastic particles slide along in contact with the pipe wall. Since the velocities are high and the melting point of the plastic particles is relatively low, the sliding of the partical along the wall actually causes the plastic at the point of contact to melt and leave a smear of plastic on the pipe wall. The smears build up over time into a long sheet of plastic. Occasionally, the sheets come loose from the walls of the pipe and form streamers.

There have been developed certain methods for decreasing the formation of fines and streamers. Most commonly, such methods involve treating the inside of the pipe to cause particles striking the pipe wall to be deflected back toward the centerline of the pipe. One method of treatment is disclosed in Avery, Jr. et al, U.S. Pat. No. 4,230,426, which cites additional patents and methods in the field.

The above described methods of pipe treatment have been at least somewhat effective in reducing the formation of fines and streamers in straight pipes. However, pneumatic conveying systems typically include bends in the pipes. These bends are normally formed by long radius elbows. Pipe interior surface treatment methods have been applied to such elbows but have not been as effective as in the case of straight pipes.

The primary problem with long radius elbows, as regards product degredation, is in the fact that the particles tend to travel along the wall of the pipe on the outside of the bend. The particles either slide along the wall, thereby leading to the formation of streamers, or bounce repeatedly along the pipe surface, thereby leading to the formation of fines. An additional shortcoming in the use of long radius elbows is in the energy loss due to frictional contact of the product with the pipewall in the bend. Additionally, long radius elbows are difficult to build and install in piping systems. Also, the elbows tend to wear out faster than do the straight pipes in the systems, and therefore, have to be replaced relatively frequently, which leads to increased system down time.

It is therefore an object of the present invention to provide an elbow for use in pelletized plastic pneumatic conveying systems that overcomes the shortcomings of the prior art. More specifically, it is an object of the present invention to provide an elbow for use in pneumatic conveying systems that reduces product degredation. It is a further object of the present invention to provide an elbow for use in pneumatic conveying systems that decreases energy loss. It is further object of the present invention to provide an elbow for use in pneumatic conveying systems that has decreased life expectancy over those of the prior art. It is yet a further object of the present invention to provide an elbow for use in pneumatic conveying systems that is easier to build and install.

SUMMARY OF THE INVENTION

Briefly stated, the foregoing and other objects are accomplished by the elbow of the present invention. The elbow of the present invention includes a cylindrical first leg that is adapted for interconnection with a pipe in a pneumatic conveying system. A cylindrical second leg adapted to be connected to another pipe in the system is positioned at an angle to the first leg. A substantially flat impingement plate is positioned between the first and second legs at an angle to each of the legs such that pellets travelling substantially parallel to the axis of the first leg are deflected by the impingement plate to travel substantially parallel to the axis of the second leg. A funnel section is connected to the first and second legs and the impingement plate. The funnel section receives pellets deflected by the impingement plate and funnels them into the second leg.

The direction of travel of the product is changed by the deflection against the flat surface of the impingement plate. This eliminates the long exposure to friction common in long radius elbows where the product must remain in contact with the wall of the elbow during transit. The impingement plate is preferably removable and may be replaced from time to time.

The funnel section is constructed such that the product is decellerated prior to impingement and then reaccellerated after impingement. This is done by designing the cross sectional areas and configurations to adjust the air velocities as needed at the various regions of the elbow. The interior surfaces of the elbow may be treated in the manner of the prior art, thereby to further reduce produce degredation.

DESCRIPTION OF THE PREFERRED EMBODIMENT

Figure 1:
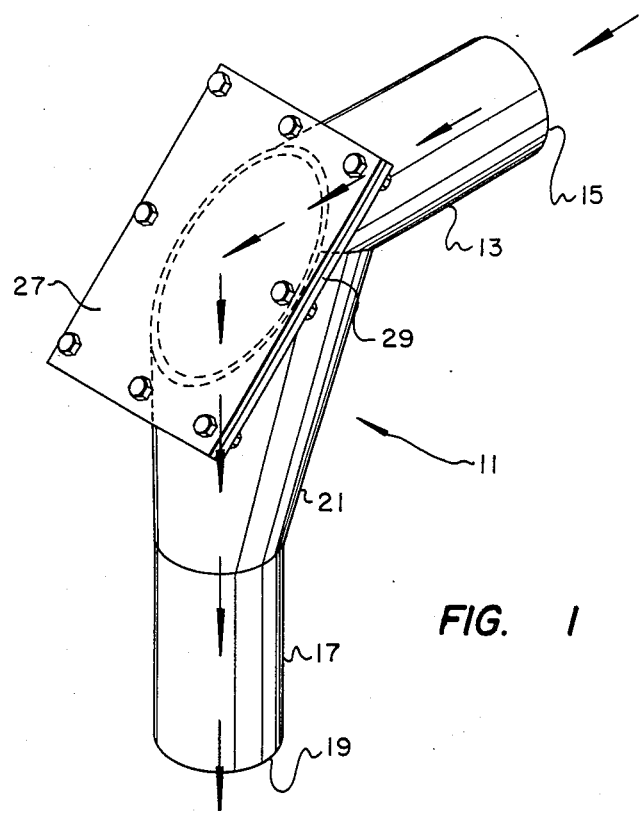
FIG. 1 is a prospective view of an elbow embodying the preferred embodiment of the present invention.

Referring now to the drawing, the preferred embodiment of the elbow of the present invention is designated generally by the numeral 11. Elbow 11 includes a cylindrical first leg 13 which is adapted to be connected to and receive product from a pipe (not shown) at its end 15. Elbow 11 further includes a second cylindrical leg 17 which is adapted to be connected and discharge product to a pipe (not shown) at its end 19.

The axes of legs 13 and 17 lie in a common plane and are positioned at an angle to each other. In the preferred embodiment, the angle between the axes of legs 13 and 17 is 90 degrees; however, the angle between the axes of the legs may be varied within the scope of the invention according to the needs of the system. Preferably, legs 13 and 17 are of the same diameter.

Elbow 11 includes a funnel section 21 having an enlarged first end 23 connected to first leg 13 and a reduced second end 25 connected to second leg 19. Funnel section 21 is of generally oval cross section in planes taken perpendicular to the axis of second leg 19.

Figure 2:
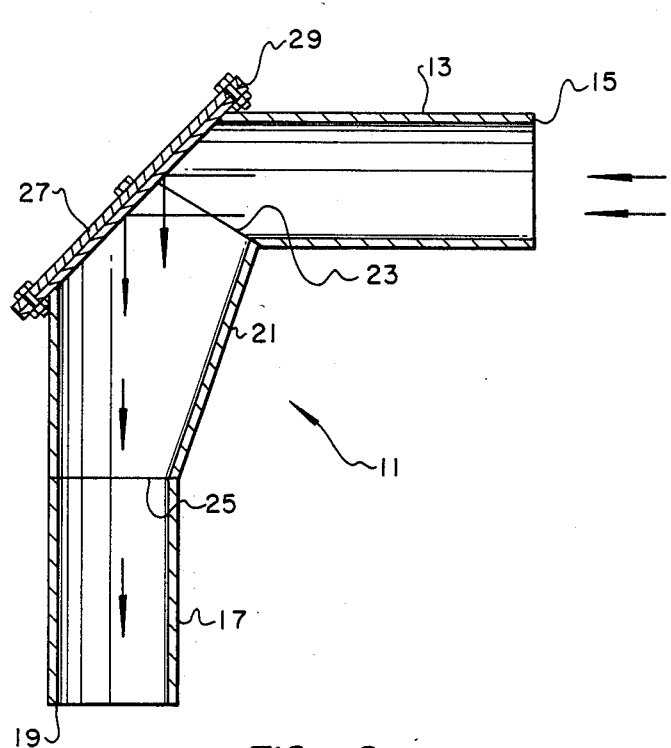
FIG. 2 is a sectional view of the elbow of the preferred embodiment of the invention.

An impingement plate 27 is provided in elbow 11 intermediate legs 13 and 17. Impingement plate 27 is substantially flat and is disposed at an angle to the axes of legs 13 and 17 so that particles traveling substantially parallel to the axis of first leg 13 are deflected upon impingement at plate 27 to travel in a direction substantially parallel to second leg 17, as shown by the arrows in FIGS. 1 and 2. Since in the preferred embodiment legs 13 and 17 are at right angles to each other, impingement plate 27 is at an angle of 45 degrees to the axes of legs 13 and 17. More generally, however, the angle of impingement plate 27 to the axes of the legs is equal to 90° minus one half the angle between the legs.

Impingement plate 27 is preferably detachably mounted to first leg 13 and funnel portion 21. Preferably, impingement plate 27 is connected to elbow 11 by means of a flange 29 connected by welding or the like to first leg 13 and funnel portion 21. The connection between impingement plate 27 and flange 29 is preferably established by means of bolts.

In operation, elbow 11 is adapted for use with product flowing in the direction generally shown by the arrows. Product flows generally parallel to the axis of first leg 13 toward impingement plate 27. Upon contact with impingement plate 27, the particles are deflected to travel in a direction generally parallel to the axis of second leg 17. The change in direction is accomplished by a single impact upon impingement plate 27 without the formation of fines or streamers. The particles deflected by impingement plate 27 are collected at the enlarged first end 23 of funnel portion 21 and funneled toward second end 25 and into second leg 17.

Additionally, the enlarged first end 23 of funnel portion 21 causes the particles to decellerate slightly before impact upon impingement plate 27. The slight decelleration decreases the force of impact upon the particles during impingement, thereby further reducing product degredation. The particles are accellerated after impingement through the decreasing cross sectional area of funnel portion 21 as they move into second leg 17.

Preferably, the interior surfaces of elbow 11 may be treated by shot peening or the like thereby to further reduce product degredation. The materials of elbow 11 are chosen to be consistant with the particular requirements of the product being conveyed.

It is therefore apparent that the present invention is well adapted to attain all of the objects and advantages hereinabove set forth, together with other advantages that are apparent from and inherent in the description and apparatus itself. It will be understood that certain combinations and subcombinations are of utility and may be employed without reference to other features and subcombinations. This is contemplated by and is within the scope of the present invention. As many possible embodiments may be made of this invention without departing from the spirit or scope thereof, it is to be understood that all matters hereinabove set forth are shown in the accompanying drawings are to be intereprted as illustrative and not in any limiting sense.

What is claimed is:

1. An elbow for use in paneumatic systems for conveying pelletized plastic products, which comprises:
   a cylindrical first leg;
   a cylindrical second leg positioned at an angle to said first leg;
   a substantially flat impingement plate positioned between said first and second legs at an angle to each of said legs such that pellets traveling substantially parallel to the axis of the first leg are deflected by said impingement plate to travel substantially parallel to the axis of said second leg;
   and a funnel section having an enlarged first end connected to said first leg and impingement plate to receive pellets deflected by said impingement plate and a reduced circular second end connected to said second leg, said funnel section having a generally oval cross section in planes taken perpendicular to the axis of said second leg, with said first end of said funnel section being sized to provide a reduced flow velocity at said impingement plate.

2. The elbow as claimed in claim 1, wherein said impingement plate is positioned at a substantially equal angle to the axis of each of said first and second legs.

3. The elbow as claimed in claim 1, wherein the angle of said impingement plate to the axis each of said first and second legs is equal to 90° less one half of the angle between the axes of said first and second legs.

4. The elbow as claimed in claim 1, wherein said impingement plate is removably connected to said funnel section and said first leg.

* * * * *